United States Patent Office 3,449,702
Patented June 10, 1969

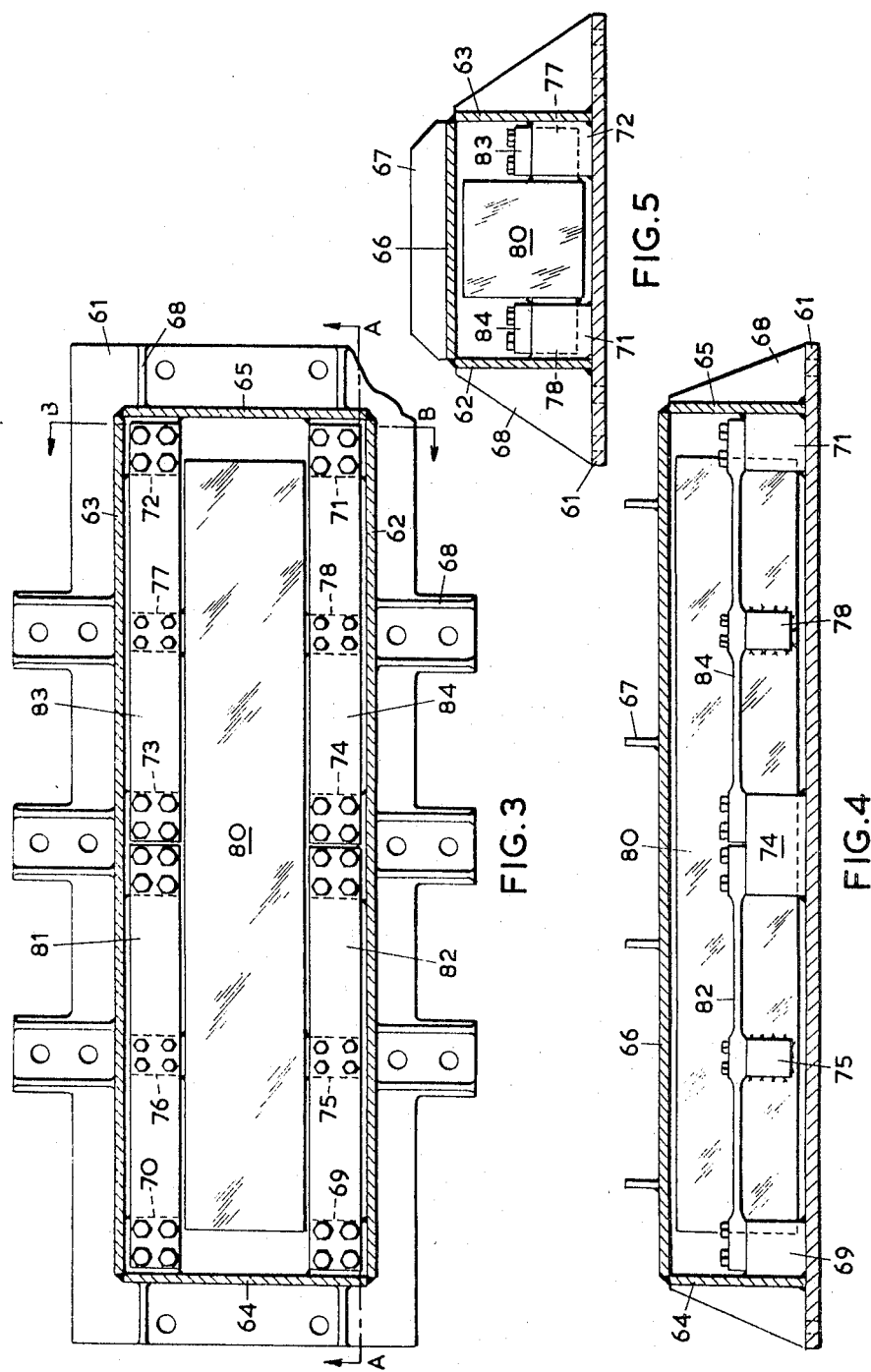

3,449,702
ELECTRICAL REACTORS
George David Wale, Stafford, England, assignor to The English Electric Company Limited, London, England, a British company
Filed Dec. 11, 1967, Ser. No. 689,399
Claims priority, application Great Britain, Dec. 9, 1966, 55,231/66
Int. Cl. H01f 15/00
U.S. Cl. 336—100      5 Claims

ABSTRACT OF THE DISCLOSURE

In an electrical reactor having a shell-type magnetic core including two yoke members connected by at least two leg members and at least one winding disposed between the two yoke members there is provided one or more vibration dampers each comprising a spring mounted mass arranged to suppress vibrations set up in the core due to alternating current flowing in the winding. Main and subsidiary dampers may be provided, the main dampers being tuned to the frequency of the alternating current and the subsidiary dampers being tuned to a harmonic of the alternating current.

---

This invention relates to electrical reactors having a shell-type magnetic core.

According to the invention there is provided an electrical reactor having a shell type magnetic core including two yoke members connected by at least two leg members, at least one winding disposed between the two yoke members, and vibration damping means mounted on at least one of the yoke members, the vibration damping means comprising a mass supported on the yoke member by springs such that the mass can move normal to the plane of the yoke member, the mass and springs being tuned to twice the frequency of altenrating current which flows in the winding or suppressing vibration of the yoke caused by the said alternating current.

In another arrangement according to the invention at least one vibration damper is tuned to twice the frequency of the alternating current and at least one vibration damper is tuned to a harmonic of the frequency of the alternating current.

Preferably the or each spring mounted mass is enclosed within an evacuated chamber.

In a preferred arrangement of the invention the or each damper comprises an elongated mass enclosed in an elongated housing which extends across the width of the reactor yoke, the mass being mounted on leaf springs arranged on either side of the mass.

In order that the invention may be more clearly understood a number of reactors including vibration dampers in accordance with the invention will now be described, by way of example, with reference to the accompanying drawings, in which:

FIG. 3 is an enlarged plan view of the vibration damper of FIG. 1 but with the top cover of the damper removed;

FIG. 4 is a section through FIG. 3 on the line A—A of FIG. 3, but shows the top cover in position;

FIG. 5 is a section through FIG. 3 on the line B—B thereof and also shows the top cover in position.

Figure 1:
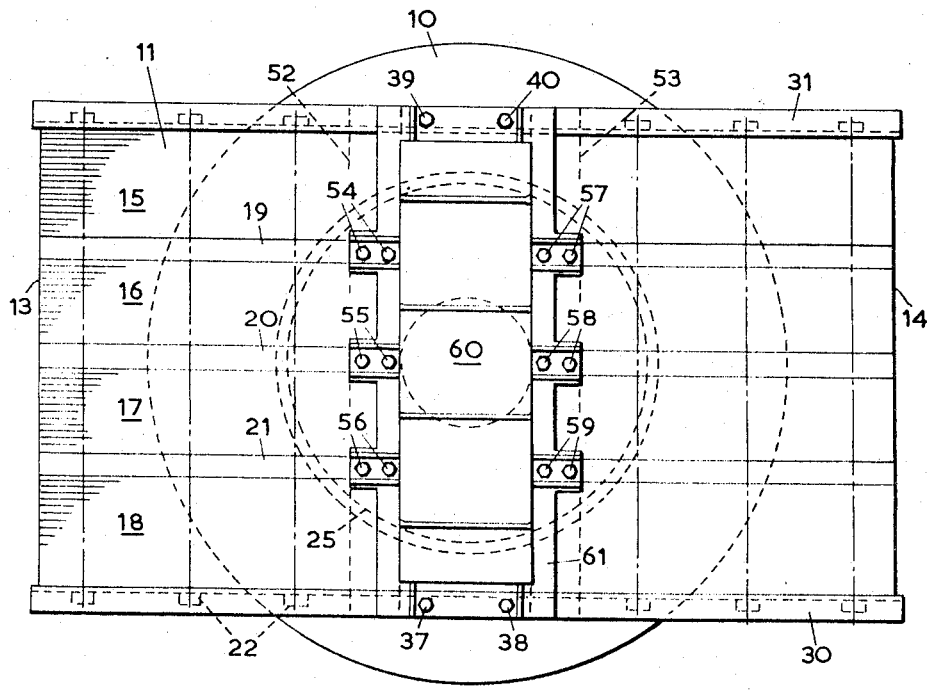
FIG. 1 is a plan view of a reactor having a vibration damper in accordance with the invention.
Figure 6:
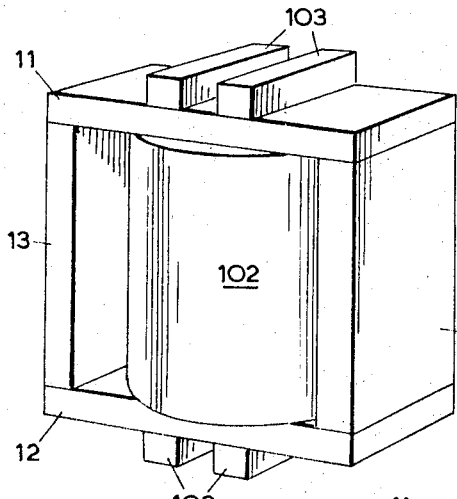
FIGS. 6, 7 and 8 are diagrammatic perspective views of reactors each having more than one vibration damper.
Figure 7:
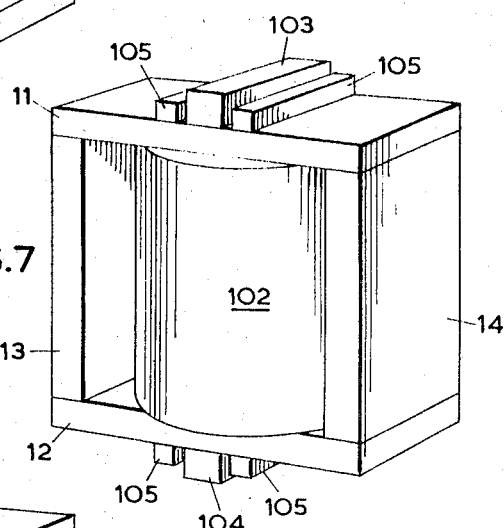
Figure 8:
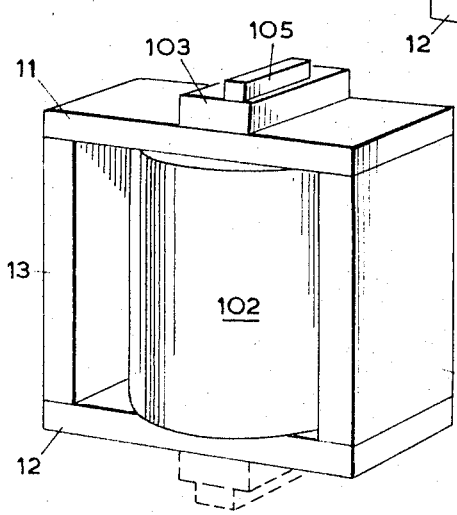

In the plan view of FIG. 1 the reactor is shown as having a winding 10 within a laminated shell type magnetic core having leg members 13 and 14 and top and bottom yoke members of which only the top member 11 is shown in FIG. 1. FIGS. 6, 7 and 8 show complete reactor cores which are rectangular with two oppoiste leg members 13 and 14 and two oppoiste yoke members 11 and 12. As shown in FIG. 1 the core is subdivided into four laminated magnetic parts 15, 16, 17 and 18 which are spaced by non-magnetic electrically insulating spacers 19, 20 and 21. The spacers may be of wood, resin impregnated wood, or any other suitable material, and the four core parts together with the spacers are bolted together between two metal beams 30 and 31, by bolts such as are shown at 22.

Figure 2:
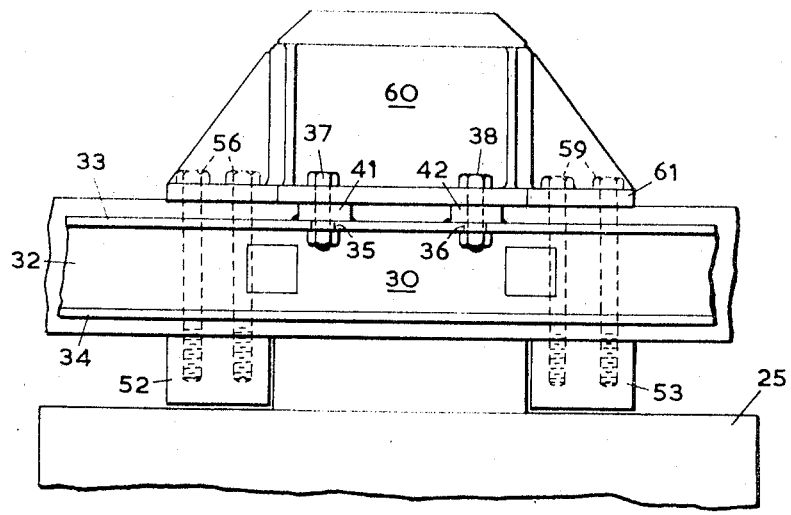
FIG. 2 is an enlarged side elevation of part of FIG. 1.

FIG. 2 shows the core as having a central supporting column 25 which extends between the two yoke members and which is also of non-magnetic electrically insulating material. The column 25 may thus be formed of material similar to that used for the spacers 19, 20 and 21.

The bolts 22 clamp the core structure between the channel section metal beams, only the two top ones of which are shown at 30 and 31, and each such beam has a flat base as shown at 32 on the beam 30 with flanges 33 and 34 normal to the base. The vibration damper, generally indicated at 60, is secured to the beams 30 and 31 as can be seen in FIG. 2 in which the base 61 of the damper is bolted by nuts and bolts, shown generally at 37 and 38, to the upper flange 33 through apertures 35 and 36 about which are welded metal collars 41 and 42 respectively. Similar nut and bolt arrangements 39 and 40 are shown associated with the beam 31.

Two resin impregnated wooden beams 52 and 53 on the underside of the top yoke member 11 serve as further anchorage for the damper which is bolted into these two beams by six pairs of bolts 56 to 59. These bolts are also of non-magnetic electrically insulating material, such for example, as resin impregnated glass fibre and pass laterally through the spacers 19, 20 and 21.

The construction of the vibration damper proper can best be seen in FIGS. 3, 4 and 5. The damper has a housing which comprises two side members 62 and 63 and two end members 64 and 65 all welded together and to the base 61. Sixteen strengthening members as shown, for example, at 68 are welded between the base and the sides and ends of the damper housing. Figs. 4 and 5 show the housing to have a top cover 66 across which are welded a number of strengthening members shown, for example, at 67 and the top cover is welded to the ends and sides of the housing.

FIG. 3 is a plan view of the vibration damper in its housing with the top cover removed and taken in conjunction with FIG. 4 it will be seen that the damper comprises four end supports 69 and 70 and 71 and 72 and two central supports 73 and 74 all welded to the base and sides of the housing. The vibration damper itself comprises a mass 80 to the sides of which are welded four supports 75 and 76 and 77 and 78 and the mass is supported on four leaf springs 81, 82, 83 and 84 which are bolted to the supports 69 to 74 of the housing and the supports 75 to 78 of the mass.

The mass-spring arrangement is tuned to the frequency of the main vibration it is required to suppress and for a commercial 50 cycles per second alternating current supply the frequency of the main vibration to be suppressed will be 100 cycles, that is, twice the supply frequency.

In order to obtain the best results from the damper the housing containing the mass is evacuated so as to minimise damping of the mass-spring arrangement. Alternatively the housing may be filled with gas, e.g., nitrogen or vapour.

Whilst the invention has been described in detail in relation to a reactor having one damper at the top thereof, various modifications of the invention are possible.

For example, FIG. 7 shows a reactor having a shell-type core comprising yoke members 11 and 12 and leg members 13 and 14, a winding 102, an upper damper 103 and a lower damper 104 which are arranged to suppress vibrations of twice the supply frequency. FIG. 7 also shows four further dampers 105. These dampers 105 are optional and may be employed where it is desired to suppress vibrations of a frequency which is an harmonic of the fundamental frequency of the alternating current supply. Since such dampers can usually be made smaller they are physically shown as such in FIG. 7.

FIG. 8 shows a reactor similar to that of FIG. 7 with a different arrangement of harmonic vibration frequency dampers in which one such damper 105 is shown mounted on a single main vibration damper 103, lower main and harmonic dampers may be provided on the lower yoke member 12 of the reactor if desired, such dampers are shown in broken lines.

FIG. 6 shows a further reactor similar to that of FIGS. 7 and 8 in which the reactor has two upper main vibration dampers 103 and two similar lower main dampers 103. However, either the upper or lower pair of dampers are optional and could be omitted. If desired harmonic vibration dampers as described can be mounted on either of the yoke members or on either of the dampers 103.

The dampers described in relation to FIGS. 6, 7 and 8 may be of similar construction to those described in relation to FIGS. 2 to 5 although all the dampers could employ helical instead of leaf springs.

Whilst the reactor has been shown as having a central supporting column this central supporting column will generally not be necessary and could be omitted. In this case a skeletal structure, preferably of wood, would be disposed in place of the column for the purpose of locating the winding.

The yoke members of the reactor have been shown as consisting of one complete member stretching between the two adjacent legs. Each yoke, could however, comprise members separate from the legs having air gaps at either end thereof or the yoke could have a central air gap.

I claim:
1. An electrical reactor having a shell type magnetic core including two yoke members connected by at least two leg members, at least one winding disposed between the two yoke members, and vibration damping means mounted on at least one of the yoke members, the vibration damping means comprising a mass supported on the yoke member by springs such that the mass can move normal to the plane of the yoke member, the mass and springs being tuned to twice the frequency of alternating current which flows in the winding for suppressing vibration of the yoke caused by the said alternating current.

2. An electrical reactor according to claim 1 including at least one additional vibration damping means mounted on the yoke member, the or each additional vibration damping means being of the same construction as the first mentioned vibration damping means and tuned to a harmonic of the frequency of the said alternating current for suppressing vibration of the yoke caused by the harmonic of the said alternating current.

3. An electrical reactor according to claim 1 including additional vibration damping means of the same constructional as the first mentioned vibration damping means and mounted thereon, the additional vibration damping means being tuned to a harmonic of the frequency of the said alternating current for suppressing vibrations of the yoke caused by the harmonic of said alternating current.

4. An electrical reactor according to claim 1 wherein the vibration damping means comprises, an elongated housing extending across the width of the yoke member and secured thereto, leaf springs extending along each side of the inside of the housing and secured thereto and an elongated mass disposed between the leaf springs and supported thereon.

5. An electrical reactor according to claim 1 in which the vibration damping means is enclosed within an evacuated chamber to minimise damping of the mass-spring arrangement.

References Cited

UNITED STATES PATENTS

| | | | |
|---|---|---|---|
| 1,255,947 | 2/1918 | Thordarson | 336—100 XR |
| 2,734,096 | 2/1956 | Ennis | 336— 100 XR |
| 2,870,858 | 1/1959 | Adams | 336—100 XR |
| 3,102,246 | 8/1963 | Honey et al. | 336—100 |
| 3,125,735 | 3/1964 | Twomey | 336—100 XR |
| 3,125,736 | 3/1964 | Aronson et al. | 336—100 |
| 3,341,793 | 9/1967 | Wale et al. | 336—100 XR |

FOREIGN PATENTS

| | | |
|---|---|---|
| 850,988 | 2/1939 | France. |

LEWIS H. MYERS, *Primary Examiner.*

T. J. KOZMA, *Assistant Examiner.*